UNITED STATES PATENT OFFICE.

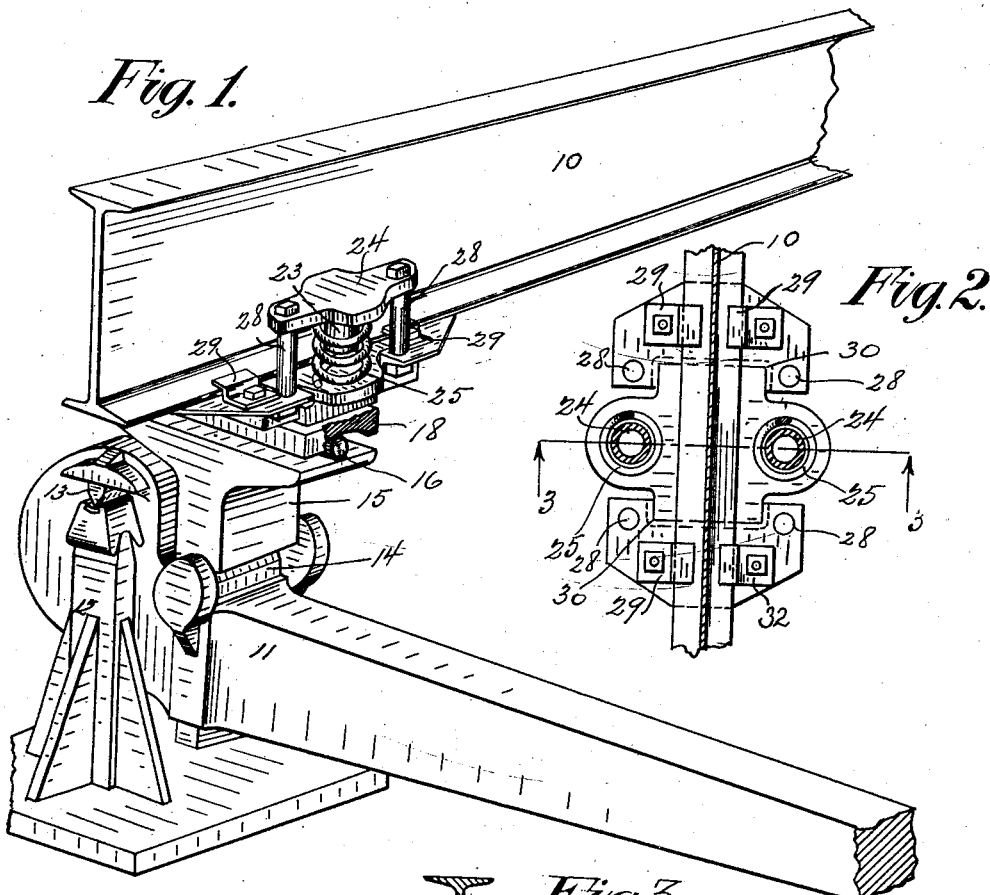

MARLON H. WINSLOW, OF TERRE HAUTE, INDIANA.

PLATFORM-SCALE.

No. 916,818.　　　Specification of Letters Patent.　　Patented March 30, 1909.

Application filed May 7, 1908. Serial No. 431,325.

*To all whom it may concern:*

Be it known that I, MARLON H. WINSLOW, of Terre Haute, county of Vigo, and State of Indiana, have invented a certain new and useful Platform-Scale; and I do hereby declare that the following is a full, clear, and exact description thereof, reference being had to the accompanying drawings, in which like numerals refer to like parts.

The object of this invention is to improve the construction of platform scales and is an improvement in connection with the features set forth in a patent granted to me June 16, 1906, No. 823,313. In scales made in accordance with said previous invention there were discovered occasional difficulties arising from the tipping of the scales as the car or wagon was being run on one end thereof. The end of the scale would be somewhat elevated, and the object of this invention is to provide means for taking up the rise and fall of the platform supports caused by the tipping referred to so that the parts of the bearings on which the platform is mounted would not be dislocated or the knife edges pounded and injured.

The chief feature of this invention consists in securing to the platform supports means provided with a spring connection with the bearings below so that the springs will take up the play or movement of the platform supports and relieve the bearings below.

The full nature of this invention will be understood from the accompanying drawings and the following description and claims:

In the drawings Figure 1 is a perspective view of a part of the scale platform support and one of the levers and the bearings for said two parts equipped with my present improvement. Fig. 2 is a horizontal section on the line 2—2 of Fig. 3. Fig. 3 is a vertical section through the upper half of what is shown in Fig. 1 on the line 3—3 of Fig. 2.

The platform of the scale is mounted on longitudinal I-beams 10, one of which is shown herein. This I-beam extends along one side of the scale and is mounted at various points on levers 11, one of which is shown, by suitable bearings. These levers transmit the weight to the mechanism that runs to the weighing apparatus. Only one of the levers 11, at one end of the beam 10, is shown. The lever 11 at its outer end is mounted on the bearing 12, but since it forms no part of this invention need not be further described, excepting that it has knife edge bearings 13 at its fulcrum point. Inside the fulcrum point, or between the ends of the lever 11, it is pivoted with a knife edge 14 on which the bearing block 15 rests. On the top of this block 15 there is a roller 16 that extends parallel with the beam 11 and which operates in the recess 17 in the underside of the bearing plate 18.

On the upper side of the bearing plate 18 there are two rollers 19 extending transversely of said plate and the lever 11 and operating in recesses 20 in the under side of the bearing plate 21. Said bearing plate 21 is formed as shown in Fig. 2 wide enough to have a portion extending on each side that supports a spiral spring 25. Over said spring a frame formed of parts 24 and 28 is located, so plate 24 will bear on the spring. A guide lug 23 projects from plate 24 into said spring. The frame formed of parts 24 and 28 is secured to the ends of the bars 29 that extend under and span the bottom of the beam 10. The bars 29 are formed, as shown in Fig. 2, with recesses 30 that surround the rectangular sides of the plate 21 so that said plate 21 acts as a guide for the vertical play of the bars 29. The bars 29 are clamped to the lower flange of the I-beam 11 by clamps or ears 32 so that said bars 29 move up and down always with the I-beam 11, whereas said I-beam merely rests upon the plate 21 but is not secured to it.

From the foregoing it is seen that normally the weight of the I-beam 10 is on the plate 21 and the parts of the bearing below. When, however, the I-beam is tipped or moves upwardly it carries with it in such slight movement the bars 29 and plate 24. But as the plates 24 move up with the beam 10, the springs 25, which are normally under pressure or tension, will continue to hold the plate 21 down, as the springs rest upon said plate. The springs 25, therefore, always hold the plate 21 down, regardless of the vertical play of the beam 10, said plate, and all the parts of the bearing below it are kept down in their proper positions, and furthermore there is no chance for the vertical movement of the beam 10 to cause any pounding of the knife edges 14 as the said springs constantly hold the parts of the bearing in contact with each other and the springs also take up the vertical movement of the I-beam. Thus it is seen that when all the bearings of the railroad or wagon scale are arranged as that herein shown and explained, the bearings will always be protected and the parts thereof maintained in their proper positions regardless of the tipping of the platform or its supports.

What I claim as my invention and desire to secure by Letters Patent is:

1. In a platform scale, a platform support, a bearing therefor, means above said bearing connected and vertically movable with the platform support, guides for guiding the vertical movement of said means with reference to said bearing and springs between said means and said bearing that are always under tension.

2. In a platform scale, a platform support, a bearing therefor, a bar on each side of said bearing and vertically guided thereby and secured to and projecting on each side of said platform support, plates connecting the ends of said bars on each side of said platform support, and springs between said plates and bearings that are always under tension, substantially as set forth.

In witness whereof, I have hereunto affixed my signature in the presence of the witnesses herein named.

MARLON H. WINSLOW.

Witnesses:
OLIVE BREEDEN,
J. H. SWAN.